US009233287B2

(12) United States Patent
Bove, Jr. et al.

(10) Patent No.: US 9,233,287 B2
(45) Date of Patent: Jan. 12, 2016

(54) FORCE-SENSING NET

(71) Applicants: Victor Michael Bove, Jr., Wrentham, MA (US); Jared Markowitz, Cambridge, MA (US); Daniel Novy, Cambridge, MA (US); Santiago Alfaro, Cambridge, MA (US)

(72) Inventors: Victor Michael Bove, Jr., Wrentham, MA (US); Jared Markowitz, Cambridge, MA (US); Daniel Novy, Cambridge, MA (US); Santiago Alfaro, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 371 days.

(21) Appl. No.: 13/734,182

(22) Filed: Jan. 4, 2013

(65) Prior Publication Data

US 2013/0172131 A1 Jul. 4, 2013

Related U.S. Application Data

(60) Provisional application No. 61/583,120, filed on Jan. 4, 2012, provisional application No. 61/603,013, filed on Feb. 24, 2012.

(51) Int. Cl.
*A63B 63/08* (2006.01)
*G01P 3/24* (2006.01)
*G01L 5/00* (2006.01)

(52) U.S. Cl.
CPC ............ *A63B 63/083* (2013.01); *G01L 5/0052* (2013.01); *G01P 3/24* (2013.01); *A63B 2220/80* (2013.01)

(58) Field of Classification Search
USPC .......................................................... 473/480
See application file for complete search history.

(56) References Cited

U.S. PATENT DOCUMENTS

| 4,858,920 | A | 8/1989 | Best |
| 2005/0107179 | A1 * | 5/2005 | Munshi ......................... 473/151 |
| 2008/0015061 | A1 | 1/2008 | Klein |
| 2009/0191988 | A1 | 7/2009 | Klein |

* cited by examiner

*Primary Examiner* — Paul A D'Agostino
*Assistant Examiner* — Ankit Doshi
(74) *Attorney, Agent, or Firm* — Stephen R. Otis (57) ABSTRACT

In exemplary implementations of this invention, a basketball net or flat net measures the translational kinetic energy of a ball that passes through an aperture in the net or impacts the net. The net includes one or more electrically conductive cords, which have a resistance that varies depending on the degree to which the cord is stretched. From sensor measurements, a processor determines: (a) instantaneous rate of change of resistance, and (b) duration of a time period that begins when resistance exceeds a baseline (with hysteresis). In the case of a basketball net, a processor may calculate the translational kinetic energy of the ball as equal to a sum of two terms. The first term is inversely proportional to the square of the duration; the second is proportional to the square of the integral of the instantaneous rate of change of resistance over the time period.

16 Claims, 5 Drawing Sheets

FORCE-SENSING NET

RELATED APPLICATIONS

This application is a non-provisional of, and claims the benefit of the filing date of, U.S. Provisional Application No. 61/583,120, filed Jan. 4, 2012, and U.S. Provisional Application No. 61/603,013, filed Feb. 24, 2012, the entire disclosures of which are herein incorporated by reference.

FIELD OF THE TECHNOLOGY

The present invention relates generally to nets.

SUMMARY

In exemplary implementations of this invention, a net is configured to measure the translational kinetic energy of a ball that passes through an aperture in the net or that impacts the net. For example, the net may be a basketball net or a flat net.

The net includes one or more electrically conductive cords. These cords may, or may not, be aligned with conventional cords in the net. Each of these electrically conductive cords has an electrical resistance that varies depending on the degree to which the cords are stretched.

At least one sensor measures change in resistance of the components as a ball impacts (or passes through an aperture in) the net. From these measurements, at least two parameters can be determined: (a) instantaneous rate of change of resistance, and (b) duration of a time period that begins when resistance exceeds a baseline plus a threshold and ends when resistance is less than a baseline minus a threshold.

At least one processor performs an algorithm that calculates an approximation of the translational kinetic energy of the ball. The approximation is equal to a sum of two terms. The first term is inversely proportional to the square of the duration; the second term is proportional to the square of the integral of the instantaneous rate of change of resistance over the time period. In the case of a sampled digital system with a sufficiently fast sampling rate, the integral may be approximated by a sum of the samples during the duration of the period.

The velocity of a ball that impacts or passes through a basketball net has both a vertical and horizontal component, each of which have a very different effect on the stretch (and thus resistance) of the conductive cords. This invention can determine both the horizontal and vertical components, based on sensor measurements from a single conductive cord. In the algorithm described above, the first term in the sum predominates in the case of the vertical component of the velocity; the second term in the sum predominates in the case of the horizontal component.

If the net is a flat net, the net may have N electrically conductive cords oriented in a horizontal direction and M electrically conductive cords oriented in a vertical direction. Further, the flat net may have N+M conventional cords aligned with the conductive cords. When a ball impacts the flat net, the peak stretch occurs at an x, y position approximately equal to the intersection of two cords: the conductive cord with the greatest stretch (and thus greatest resistance) in the horizontal direction and the conductive cord with the greatest stretch (and thus greatest resistance) in the vertical direction. In order to calculate the translational kinetic energy of a ball that impacts the flat net, the processor identifies these two cords, and then performs the above algorithm, using resistance measurements from one of these two cords.

However, in the flat net case, the first of the two terms in the sum of terms may be set to zero. That is, in the flat net case, translational kinetic energy may be well-approximated by using only the second term described above (which is proportional to the square of the integral of the instantaneous rate of change of resistance over the time period).

The processor may also derive, in conjunction with calculating the kinetic energy: (i) the ball's speed; and (ii) a force that the ball applies to the net, or that was applied to the ball.

The calculated kinetic energy or speed of the ball (or the force) may be rendered by an output device in human-readable form.

This invention has many practical uses. For example, in the case of a basketball net, this invention may be used to measure the kinetic energy and speed of a basketball that is being dunked. Or, for example, in the case of a flat net, this invention may be used to measure the kinetic energy and speed of a baseball or soccer ball that is kicked, hit, or thrown into the net.

The description of the present invention in the Summary and Abstract sections hereof is just a summary. It is intended only to give a general introduction to some illustrative implementations of this invention. It does not describe all of the details of this invention. This invention may be implemented in many other ways.

The above Figures illustrate some illustrative implementations of this invention, or provide information that relates to those implementations. However, this invention may be implemented in many other ways. The above Figures do not show all of the details of this invention.

DETAILED DESCRIPTION

In exemplary implementations of this invention, a basketball net includes one or more segments of conductive cord whose resistance changes with degree of stretch. For example, the resistance may increase as the stretch increases. Examples of such material include carbon-impregnated silicone cord and metalized textile threads and yarns.

In some cases, the conductive cords are roughly aligned with at least some of the conventional cords in the net. For example, the conductive cords may be inserted into a hollow conventional cord making up the net, or may be woven into the conventional cord itself.

By passing a low voltage and current through the conductive material and measuring the resistance over time (e.g., taking samples using analog-to-digital conversion circuitry), computing hardware associated with this net can calculate energy and speed of a basketball traveling through the net. Applications include training, toys that indicate the energy and speed on a display, "dunk competitions," and augmented reality effects on television broadcasts driven by the data from the net.

In exemplary implementations, the net is less expensive and more robust than conventional approaches to measuring data about the ball (e.g., photosensors or ultrasonic sensors) and doesn't require a physical change to the hoop or backboard other than providing electrical connections to the net. If the basketball hoop is made of metal and thus conductive, it is preferable to arrange for the conductive segments and their electrical connections to be insulated from the hoop where the hoop contacts the net.

The conductive material can extend throughout the entire net or can be incorporated into one or more smaller sections.

Figure 1:
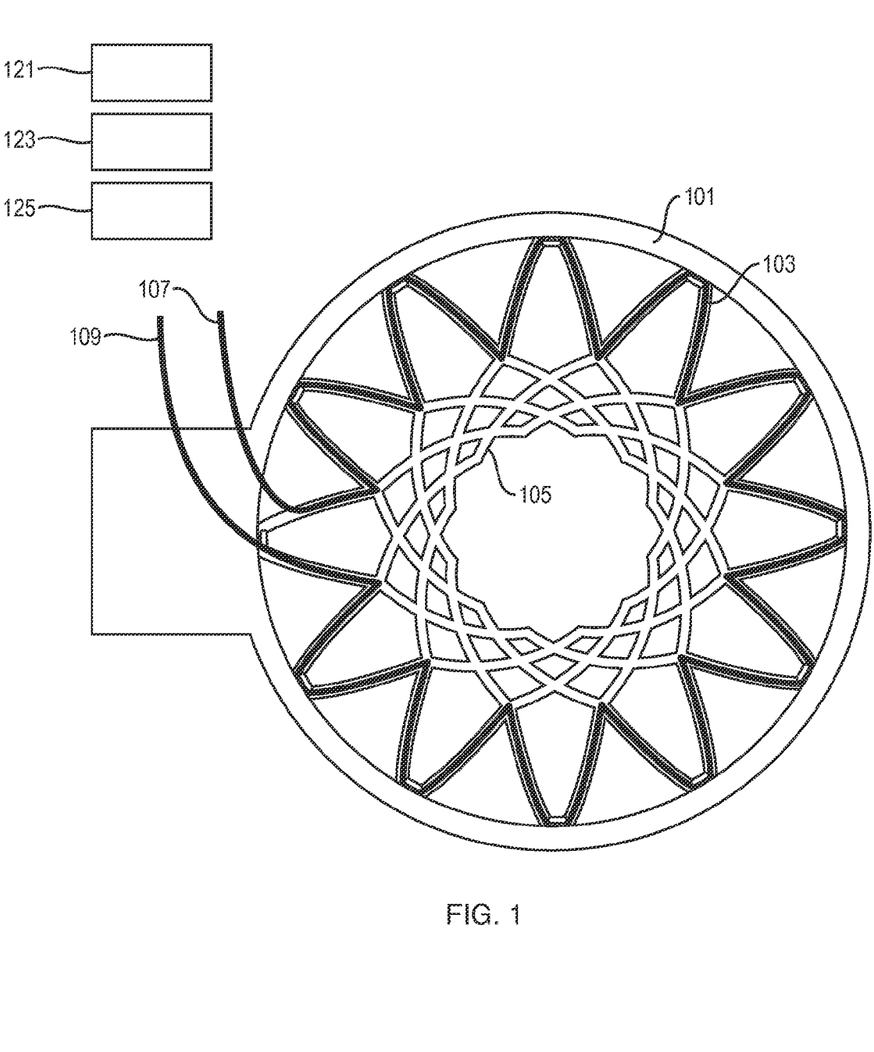
FIG. 1 shows a basketball net that includes a single electrically conductive cord.
Figure 2:
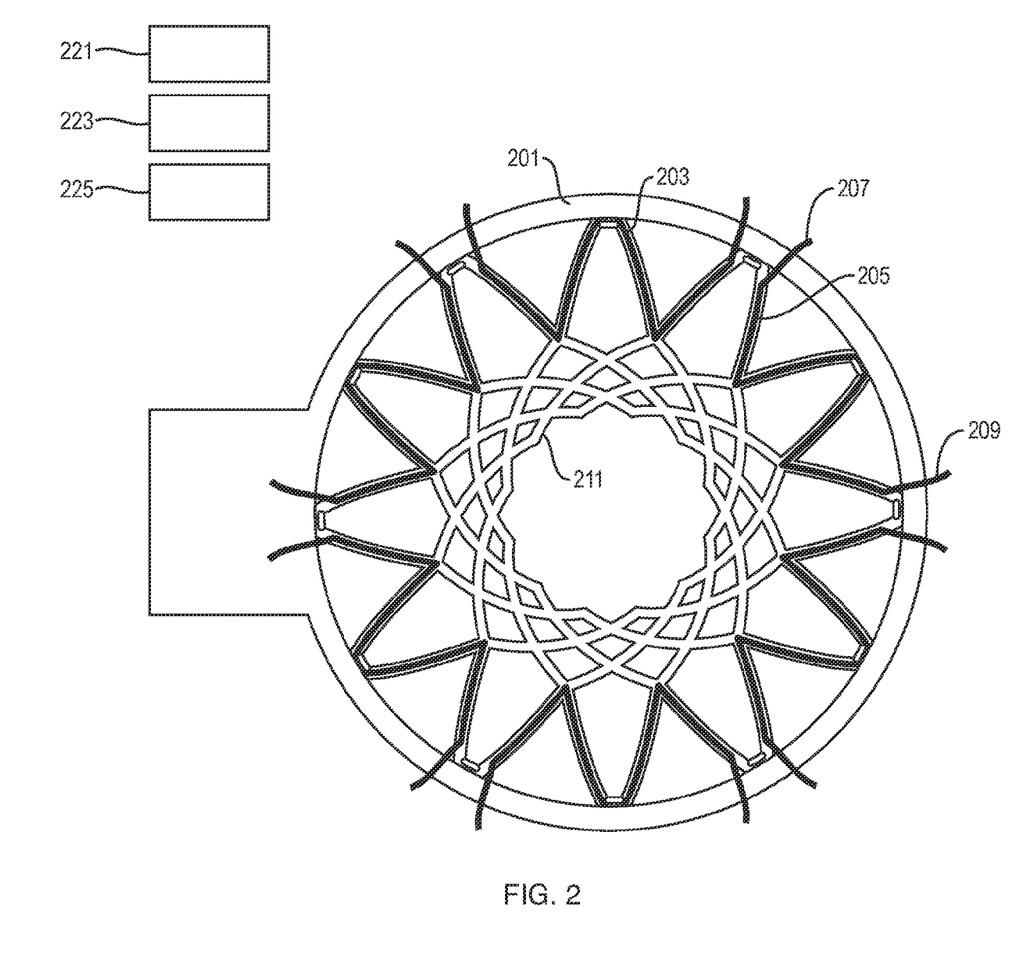
FIG. 2 shows a basketball net that includes multiple electrically conductive cords.

FIGS. 1 and 2 show examples of basketball nets that are configured to measure the translational kinetic energy of a basketball that passes through the net. In FIG. 1, the net includes only one electrically conductive cord 103. In FIG. 2, the net includes multiple electrically conductive cords (e.g., 203, 205).

In the example shown in FIG. 1: (1) the net includes a single electrically conductive cord 103, the resistance of which depends on the degree to which this cord is stretched; (2) the net also includes conventional cords 105; (3) the net is attached to a metal hoop 101; and (4) the electrically conductive cord 103 and leads 107, 109 are electrically insulated from the metal hoop 101.

Figure 3:
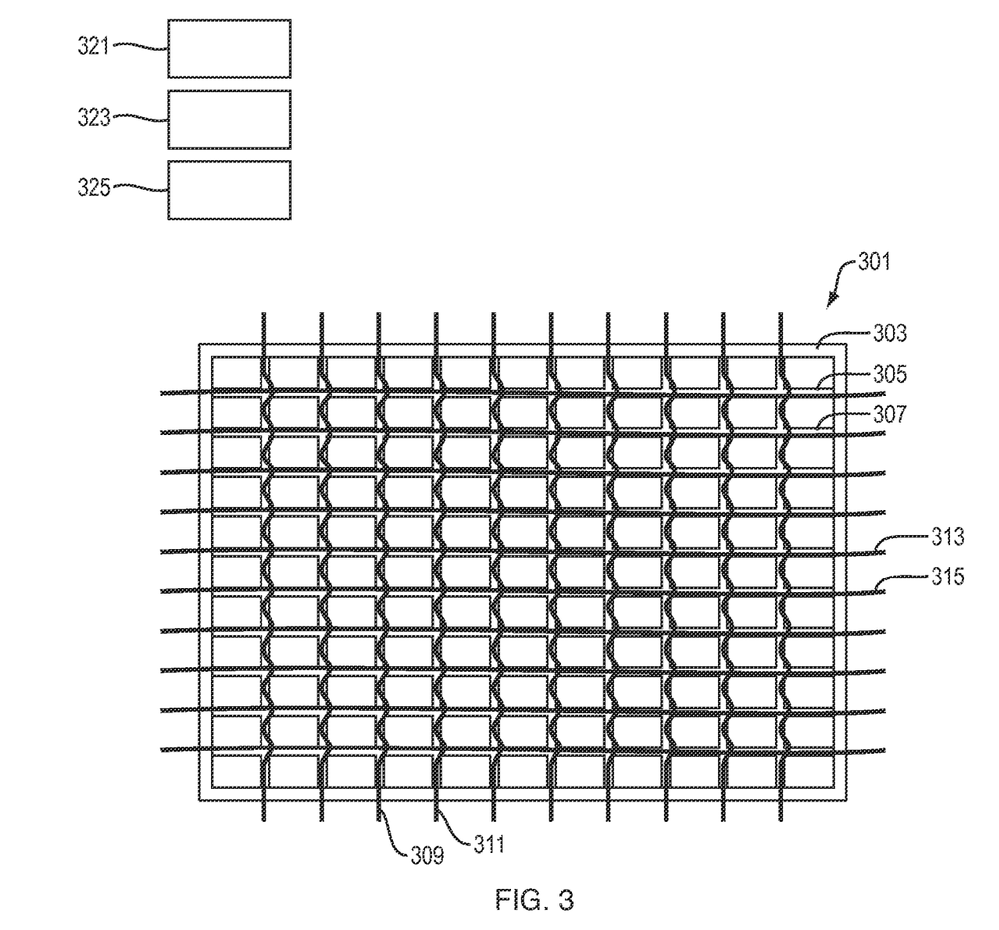
FIG. 3 shows a flat net, in which electrically conductive cords form a crisscross pattern.

In the example shown in FIG. 3: (1) the net includes multiple electrically conductive cords (e.g., 203, 205), the resistance of which depends on the degree to which this cord is stretched; (2) the net also includes conventional cords 211; (3) the net is attached to a metal hoop 201; and (4) the electrically conductive cords (e.g., 203, 205) and leads (e.g., 207, 209) are electrically insulated from the metal hoop 201.

This invention may be implemented as a flat net that can measure translational kinetic energy and velocity of a ball hit or pitched into it (as in baseball or tennis). In some implementations, the flat net is divided electrically into multiple zones and can also measure position of the ball's impact (e.g., for determining whether a practice baseball pitch would have been a strike) through comparison of the resistances of the various segments over time. These different resistive segments may be measured simultaneously or may be scanned rapidly in a time-multiplexed arrangement.

FIG. 3 shows an example of a flat net 301. The flat net is attached to a metal frame 303. The flat net includes a crisscross pattern of electrically conducting cords, some of which (e.g. 309, 311) are oriented vertically and some of which (e.g., 313, 315) are oriented horizontally. The electrically conducting cords are generally aligned with a crisscross pattern of conventional cords (e.g., 305, 307), and are electrically insulated from each other and the metal frame.

Other arrangements besides those shown in FIGS. 1, 2 and 3 may be used instead, and may prove advantageous in various applications.

In exemplary implementations of this invention, a basketball net incorporates one or more segments of conductive fiber or cord whose resistance changes with degree of stretch. This resistance is measured. The resistance measurement is used for computing energy of a basketball that passes through a basketball net (e.g., by dunking).

The passage of a ball is detected by setting a threshold (with hysteresis) depending on the baseline resistance of the net. Thus, two parameters are available: instantaneous increase in resistance and time duration of the increase (effectively the duration of the ball's contact with the net). Depending on the trajectory of the ball its velocity can have a vertical and a horizontal component, and each of these has a very different effect on the stretch (and thus resistance) over time, leading to a dunk of equal energy producing very different readings when it hits the net at different angles.

One possible solution is to segment the net and compare the stretch applied to different segments, but in some situations it is impractical to have more than one set of electrical connections to the net.

Thus, in preferred embodiments of this invention, separate resistance readings for different segments of the net are not taken. Instead, a single resistance reading (at any given time) is taken, from which the problem is solved.

In exemplary implementations of this invention, a basketball net is sufficiently tightly constructed that a ball going through vertically will experience some friction with the net and produce a measurable stretch. Such a vertical velocity will result in the ball being in contact (and the resistance reading changing) for a time interval that decreases with the ball's velocity. The energy associated with this velocity is proportional to the square of the velocity (and thus to the reciprocal of the square of the duration).

A ball traveling through the net but hitting the net mostly horizontally, on the other hand, has an energy proportional to the square of the integral of the change in resistance over the time duration.

Thus in the general case the translational kinetic energy is well-approximated as the sum of two terms:

$$\text{energy} \approx k_1/\text{duration}^2 + k_2 [\int \Delta R \, dt]^2 \quad \text{(Equation 1)}$$

where R is resistance, t is time, and $k_1$ and $k_2$ are constants that are determined by calibrating experiments.

The first term dominates for a ball moving quickly through the net vertically, and the second term dominates for a ball that hits the side of the net and remains inside the net for a longer period. In the case of a sampled digital system the integral is approximated by a sum of samples during the duration (assuming a high enough sampling rate to estimate the duration with reasonable precision).

In exemplary implementations, the energy of a ball passing through a force-sensing net (e.g., by dunking) may be calculated using Equation 1. The algorithm shown in FIG. 1 may be employed for these calculations.

One or more processors may be used for these calculations. (For example, rectangles 123, 223, 323 in FIGS. 1, 2, 3, respectively, each represent one or more processors). At least some of the processors may be remote from the force-sensing net. The processors may be connected by wired or wireless connection (1) to a sensor (e.g., 121, 221, 321) for measuring resistance in the force-sensing net, and (2) to an output device (e.g. 125, 225, 325) for rendering the calculated energy or speed in a human-readable format.

This invention may be implemented as a flat, two-dimensional net, where N sensor circuits in one dimension are insulated from M sensor circuits in the other dimension, and where N+M resistance readings can be taken by scanning along each dimension. The (x, y) coordinates of the point of contact by the ball can be estimated as the locations of the peak resistance values (once an above-threshold value is detected) along each dimension. Interpolation (such as bicubic) can be applied if a finer location estimate is desired.

In some implementations, sensors take the N+M resistance readings for the flat net simultaneously. Alternately, the N+M resistance readings may be taken sequentially.

In the flat net case, the same energy-estimating algorithm (Equation 1 and FIG. 1) can be used. The algorithm is applied to a single sensor circuit in one dimension that first registered the above-threshold value. In the flat net case, however, the first proportionality constant ($k_1$) in Equation 1 may be set to zero. In other words, in the flat net case, the translational kinetic energy may be well approximated by the second term on the right in Equation 1. This second term is proportional to the square of the integral of the change in resistance over the time duration.

Even in the round-net case (e.g., a basketball net), it may suffice in some circumstances to calculate only one of the two terms in Equation 1: i.e., to set one of the two proportionality constants ($k_1$ and $k_2$) in Equation 1 to zero. Whether such an approach would suffice may depend on the expected trajectory of the ball and the orientation of the net. For example, if a basketball is expected to pass vertically through a net (on a straight-down dunk), using only the first term on the right ($k_1/duration^2$) in Equation 1 may achieve a close approximation. Likewise, if the basketball is expected to strike the basketball net almost horizontally, then using only the second term on the right ($k_2[\int \Delta R dt]^2$) in Equation 1 may suffice.

Because the sensor material may not respond uniformly throughout a two-dimensional net (e.g., the ball may create less stretch near the supported edges of the net than in the center) the detection thresholds or the constants in the energy-calculation algorithm may be varied as a function of position, based on calibrated measurements.

Figure 4:
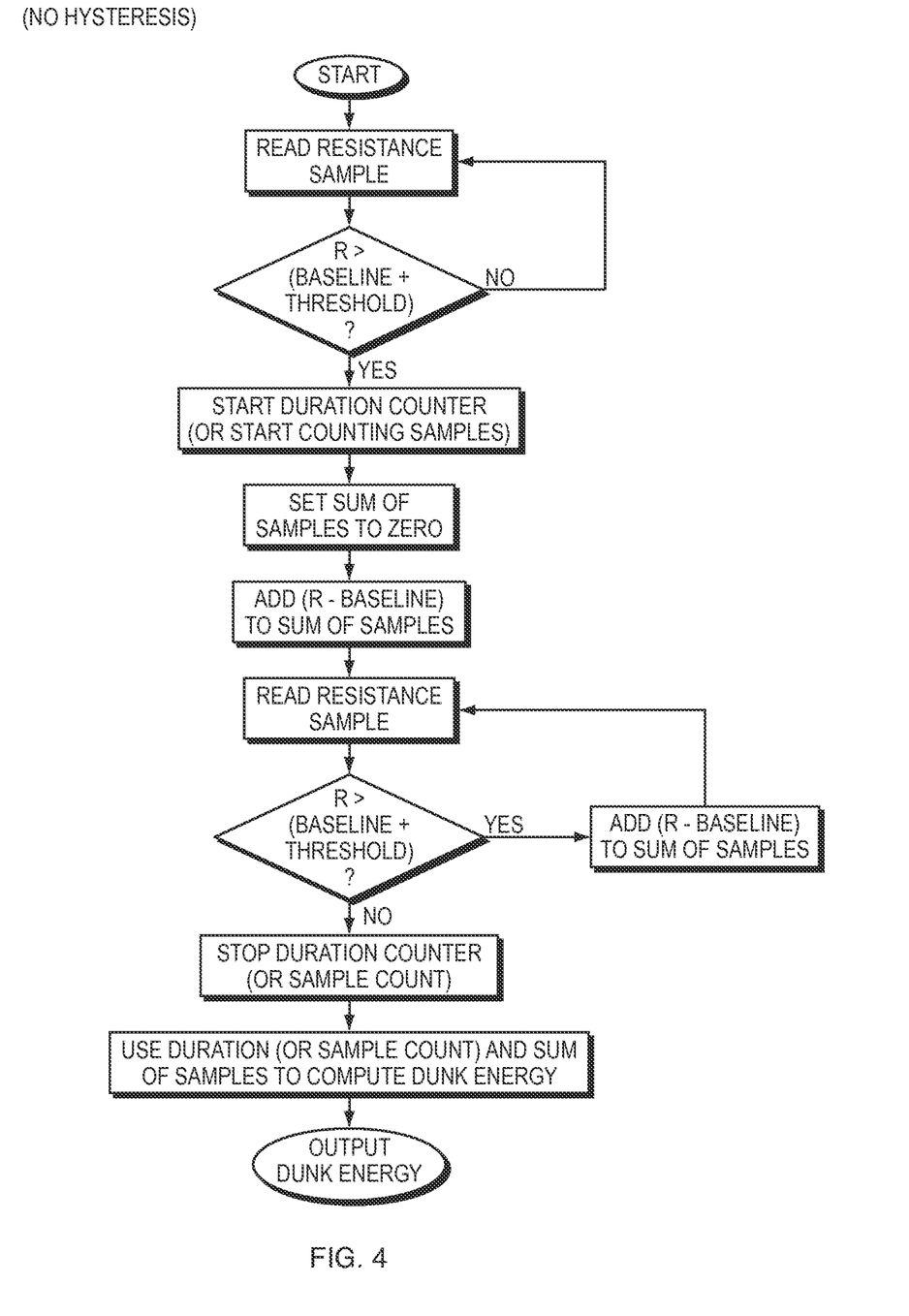
FIG. 4 shows a flowchart for determining (without hysteresis) the translational kinetic energy of a ball that impacts or passes through a net.

FIG. 4 shows a flowchart for determining (without hysteresis) the translational kinetic energy of a ball that impacts or passes through a net.

Figure 5:
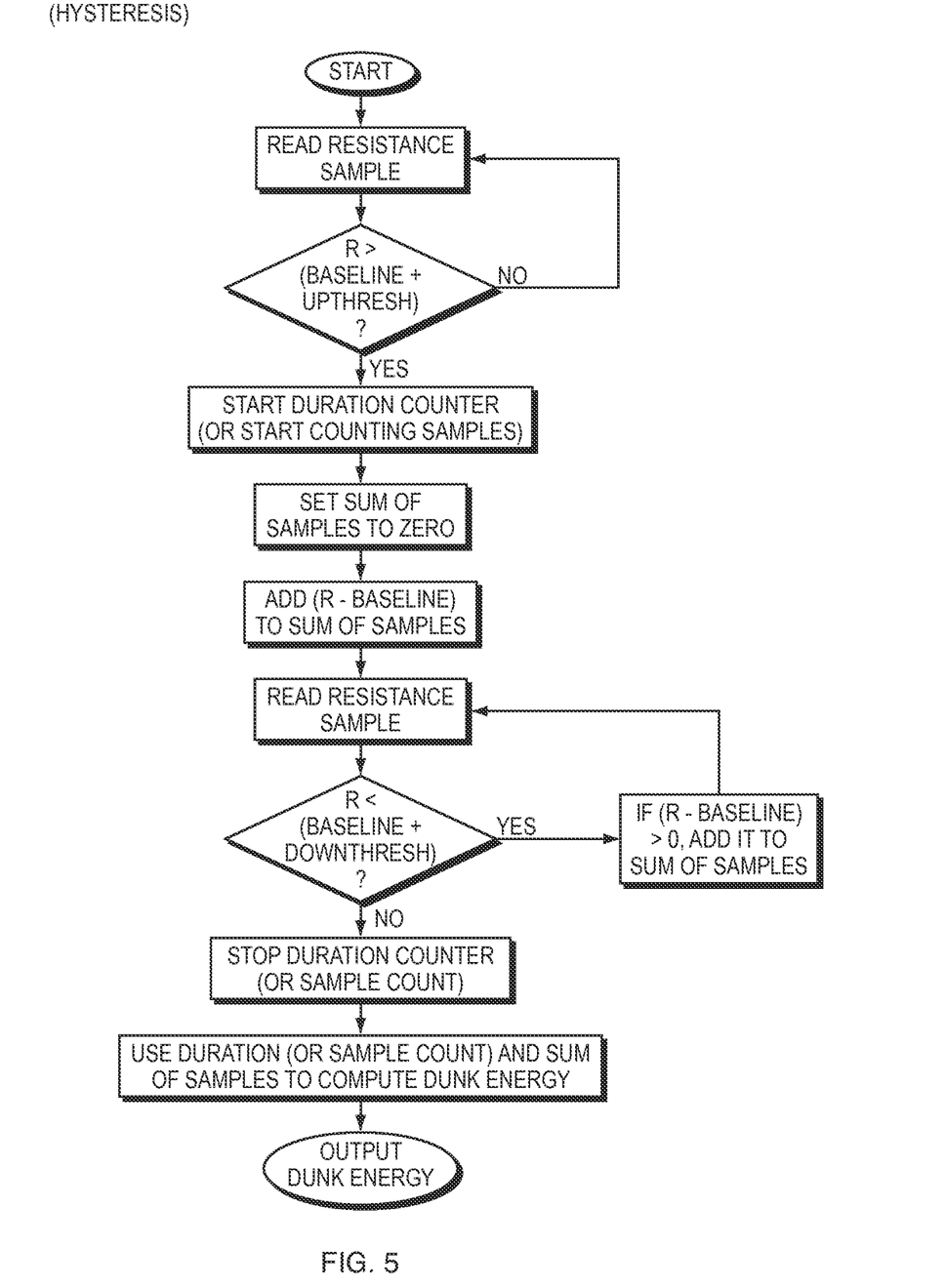
FIG. 5 shows a flowchart for determining (with hysteresis) the translational kinetic energy of a ball that impacts or passes through a net.

FIG. 5 shows a flowchart for determining (with hysteresis) the translational kinetic energy of a ball that impacts or passes through a net.

In some alternative implementations, the resistance of the electrically conductive material decreases as stretch increases (rather than increasing as stretch increases). In those alternative implementations, the above algorithm and flow charts are modified accordingly. For example, in those implementations, the time period measured may begin when resistance is less than a baseline minus a first amount and end when resistance exceeds the baseline plus a second amount

DEFINITIONS AND CLARIFICATIONS

Here are a few definitions and clarifications. As used herein:

The terms "a" and "an", when modifying a noun, do not imply that only one of the noun exists.

The term "comprise" (and grammatical variations thereof) shall be construed broadly, as if followed by "without limitation". If A comprises B, then A includes B and may include other things.

The term "cord" shall be construed broadly. For example, one or more fibers may comprise a cord.

The term "e.g.," means including without limitation.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes "a third" thing, a "fourth" thing and so on shall be construed in like manner.

The terms "horizontal" and "vertical" shall be construed broadly. For example, "horizontal" and "vertical" may refer to two arbitrarily chosen coordinate axes in a Euclidian two dimensional space.

The term "include" (and grammatical variations thereof) shall be construed broadly, as if followed by "without limitation".

The term "or" is inclusive, not exclusive. For example "A or B" is true if A is true, or B is true, or both A or B are true. Also, for example, a calculation of "A or B" means a calculation of A, or a calculation of B, or a calculation of A and B.

A parenthesis is simply to make text easier to read, by indicating a grouping of words. A parenthesis does not mean that the parenthetical material is optional or can be ignored.

The phrase "to render in human readable form" (and other phrases of similar import) shall be construed broadly. For example, it includes outputting audio or visual stimuli that are perceivable by unaided human perception.

Variations:

This invention may be implemented in many different ways. Here are some non-limiting examples.

This invention may be implemented as apparatus comprising in combination: (a) a net; (b) at least one sensor; and (c) at least one processor; wherein: (i) the net includes one or more components, each of which components comprises a material that has an electrical resistance that varies depending on the extent to which the material is stretched, (ii) the at least one sensor is configured to take measurements of changes in electrical resistance of each of the one or more components, respectively, (iii) the at least one processor is configured (A) to perform a computation to calculate, based at least in part on the measurements, a calculated value indicative of the translational kinetic energy of a ball that strikes or passes through the net, and (B) to output signals to cause an output device to render the calculated value in a human-readable form; and (iv) the calculated value is in a range, which range is the range of values that may be outputted by the computation, and which range includes more than two values. Furthermore: (1) the net may comprise a basketball net; (2) the net may comprise a flat net; (3) the computation may include a calculation of an instantaneous rate of change in resistance; (4) the computation may include a calculation of duration of a time period, which period starts when resistance exceeds a baseline plus a first amount and ends when resistance is less than the baseline minus a second amount; (5) the first and second amounts may be different; (6) the computation may include one or more calculations of (a) an instantaneous rate of change in resistance, or (b) a duration of a time period, which period starts when resistance exceeds a baseline plus a first amount and ends when resistance is less than the baseline minus a second amount; (7) the computation may include a mathematical operation involving a first term that is inversely proportional to the square of the duration, or that is proportional to the square of speed of the ball; (8) the computation may include a mathematical operation involving a second term that is proportional to the square of the integral of the change in resistance over the time period; (9) the computation may include approximating the integral by performing a calculation that includes computing a sum of samples taken during the time period; (10) the first term may be proportional to a first constant and the second term may be proportional to a second constant; (11) a computation for a single impact of the ball on the net may be based on measurements readings from a single component; (12) (i) the net may be a flat net, (ii)

the one or more components may include N elongated components oriented in along a first direction and M elongated components oriented along a second direction, (iii) the at least one sensor may be configured to measure resistance in each of the N+M components respectively, (iv) the at least one processor may be configured to identify a particular component that exhibits maximum resistance out of the M components, or out of the N components, or out of the N+M components, during the time period, and (v) measurements of resistance for the particular component taken during time period may be either the sole measurements of resistance taken during the time period that are inputted into the computation, or may be weighted more heavily in the computation than measurements of resistance of other components taken during the time period; (13) the at least one sensor may be configured to measure resistance in each of the N+M components simultaneously; (14) the at least one sensor may be configured to measure resistance in each of the N+M components sequentially; (15) the computation may further include a calculation of a calculated speed of the ball, and the processor may be further configured to output signals to cause the output device to render the calculated speed in a human-readable form; and (16) the electrical resistance of the material may decrease as stretch of the material increases, and the computation may include one or more calculations of an instantaneous rate of change in resistance or a duration of a time period, which period starts when resistance is less than a baseline minus a first amount and ends when resistance exceeds the baseline plus a second amount.

This invention may be implemented as a method comprising in combination: (a) using at least one sensor to take measurements of changes in electrical resistance of each of the one or more components, which components are part of a net and each comprise a material that has an electrical resistance that varies depending on the extent to which the material is stretched; and (b) using at least one processor (i) to perform a computation to calculate, based at least in part on the measurements, a calculated value indicative of the translational kinetic energy of a ball that strikes or passes through the net, and (ii) to output signals to cause an output device to render the calculated value in a human-readable form; wherein the calculated value is in a range, which range is the range of values that may be outputted by the computation, and which range includes more than two values. Furthermore: (1) the computation may include a calculation of an instantaneous rate of change in resistance; and (2) the computation may include a calculation of duration of a time period, which period starts when resistance exceeds a baseline plus a first amount and ends when resistance is less than the baseline minus a second amount.

CONCLUSION

It is to be understood that the methods and apparatus that are described herein are merely illustrative applications of the principles of the invention. Numerous modifications may be made by those skilled in the art without departing from the scope of the invention.

What is claimed is:

1. Apparatus comprising in combination:
    (a) a flat net that includes N elongated components oriented in along a first direction and M elongated components oriented along a second direction;
    (b) at least one sensor; and
    (c) at least one processor;
    wherein
    (i) each of the N+M components, respectively, comprises a material that has an electrical resistance that varies depending on the extent to which the material is stretched,
    (ii) the at least one sensor is configured to take measurements of changes in electrical resistance of each of the N+M components, respectively,
    (iii) the at least one processor is configured
        (A) to calculate duration of a time period, which period starts when resistance exceeds a baseline plus a first amount and ends when resistance is less than the baseline minus a second amount,
        (B) to identify a particular component that exhibits maximum resistance out of the M components, or out of the N components, or out of the N+M components, during the time period,
        (C) to perform a computation to calculate, based at least in part on the measurements, a calculated value indicative of the translational kinetic energy of a ball that strikes the net, and
        (D) to output signals to cause an output device to render the calculated value in a human-readable form,
    (iv) the calculated value is in a range, which range is the range of values that may be outputted by the computation, and which range includes more than two values, and
    (v) measurements of resistance for the particular component taken during the time period are either (1) the sole measurements of resistance taken during the time period that are inputted into the computation, or (2) are weighted more heavily in the computation than measurements of resistance of other components taken during the time period.

2. The apparatus of claim 1, wherein the computation includes a mathematical operation involving a term that is proportional to the square of the integral of the change in resistance over the time period.

3. The apparatus of claim 2, wherein the computation includes approximating the integral by performing a calculation that includes computing a sum of samples taken during the time period.

4. The apparatus of claim 1, wherein the computation includes a calculation of an instantaneous rate of change in resistance.

5. The apparatus of claim 1, wherein the first and second amounts are different.

6. The apparatus of claim 4, wherein the computation includes a mathematical operation involving a first term that is inversely proportional to the square of the duration, or that is proportional to the square of speed of the ball.

7. The apparatus of claim 4, wherein the computation includes a mathematical operation involving a second term that is proportional to the square of the integral of the change in resistance over the time period.

8. The apparatus of claim 7, wherein the computation includes approximating the integral by performing a calculation that includes computing a sum of samples taken during the time period.

9. The apparatus of claim 7, wherein the first term is proportional to a first constant and the second term is proportional to a second constant.

10. The apparatus of claim 1, wherein a computation for a single impact of the ball on the net is based on measurements readings from a single component.

11. The apparatus of claim 1, wherein the at least one sensor is configured to measure resistance in each of the N+M components simultaneously.

12. The apparatus of claim 1, wherein the at least one sensor is configured to measure resistance in each of the N+M components sequentially.

13. The apparatus of claim 1, wherein:
   (a) the computation further includes a calculation of a calculated speed of the ball; and
   (b) the processor is further configured to output signals to cause the output device to render the calculated speed in a human-readable form.

14. The apparatus of claim 1, wherein the electrical resistance of the material decreases as stretch of the material increases.

15. A method comprising in combination:
   (a) using at least one sensor to take measurements of changes in electrical resistance of each component, respectively, in a set of components, which set of components
      (i) re part of a flat net
      (ii) each comprise a material that has an electrical resistance that varies depending on the extent to which the material is stretched, and
      (iii) comprises N elongated components oriented in along a first direction and M elongated components oriented along a second direction; and
   (b) using at least one processor
      (i) to calculate duration of a time period, which period starts when resistance exceeds a baseline plus a first amount and ends when resistance is less than the baseline minus a second amount,
      (ii) to identify a particular component that exhibits maximum resistance out of the M components, or out of the N components, or out of the N+M components, during the time period,
      (iii) to perform a computation to calculate, based at least in part on the measurements, a calculated value indicative of the translational kinetic energy of a ball that strikes the net, and
      (iv) to output signals to cause an output device to render the calculated value in a human-readable form;
   wherein
      (A) the calculated value is in a range, which range is the range of values that may be outputted by the computation, and which range includes more than two values; and
      (B) measurements of resistance for the particular component taken during the time period are either (1) the sole measurements of resistance taken during the time period that are inputted into the computation, or (2) are weighted more heavily in the computation than measurements of resistance of other components taken during the time period.

16. The method of claim 15, wherein the computation includes a calculation of an instantaneous rate of change in resistance.

* * * * *